United States Patent
Karnin et al.

(10) Patent No.: US 10,885,548 B2
(45) Date of Patent: Jan. 5, 2021

(54) SYSTEM AND METHOD FOR IDENTIFICATION OF SUBJECT LINE TEMPLATES

(71) Applicant: VERIZON MEDIA INC., New York, NY (US)

(72) Inventors: Zohar Karnin, Haifa (IL); Edo Liberty, Haifa (IL); David Wajc, Haifa (IL); Guy Halawi, Haifa (IL)

(73) Assignee: VERIZON MEDIA INC., New York, NY (US)

( * ) Notice: Subject to any disclaimer, the term of this patent is extended or adjusted under 35 U.S.C. 154(b) by 736 days.

(21) Appl. No.: 14/020,614

(22) Filed: Sep. 6, 2013

(65) Prior Publication Data
US 2015/0073895 A1    Mar. 12, 2015

(51) Int. Cl.
*H04L 12/58*    (2006.01)
*G06Q 30/02*    (2012.01)

(52) U.S. Cl.
CPC ....... *G06Q 30/0251* (2013.01); *H04L 51/063* (2013.01); *H04L 51/22* (2013.01); *H04L 51/36* (2013.01)

(58) Field of Classification Search
CPC ...... G06Q 10/10; G06Q 10/107; G06Q 30/02; H04L 51/00; H04L 51/12; G06N 5/047; G06F 3/048; G06F 17/30
USPC .................................. 715/752, 769; 706/20
See application file for complete search history.

(56) References Cited

U.S. PATENT DOCUMENTS

| | | | | |
|---|---|---|---|---|
| 6,816,885 B1 * | 11/2004 | Raghunandan | ......... | H04L 51/12 709/206 |
| 7,072,942 B1 * | 7/2006 | Maller | ..................... | H04L 51/12 709/206 |
| 2009/0182788 A1 * | 7/2009 | Chung | .................. | G06Q 10/107 |
| 2013/0191759 A1 * | 7/2013 | Bhogal | .................. | G06Q 10/10 715/752 |
| 2014/0278909 A1 * | 9/2014 | Potter | ................. | G06Q 30/0242 705/14.41 |
| 2015/0033141 A1 * | 1/2015 | Mishra | .................... | H04L 51/22 715/752 |
| 2015/0100527 A1 * | 4/2015 | Ryan | ........................ | H04L 51/12 706/20 |

* cited by examiner

*Primary Examiner* — Hajime Rojas
*Assistant Examiner* — Rodney Henry
(74) *Attorney, Agent, or Firm* — James J. De Carlo; Greenberg Traurig, LLP

(57) ABSTRACT

Disclosed is a system and method for email management that leverages information derived from automatically generated templates in order to identify types of message and message content. The systems and methods discussed herein involve identifying messages matching specific template types and structures, and automatically extracting important data from email messages matching those templates. The extracted data enables improvements for a user's experience and increased monetization. That is, templates can be analyzed to determine a type of email message, which in turn can be presented to a receiving user within an automatic folder or tag designation. Additionally, email snippets or previews can be generated from the extracted data for display within a user's inbox. Also, the extracted data can be used for monetization purposes, by serving targeted advertisements based upon the data extracted from such messages.

16 Claims, 6 Drawing Sheets

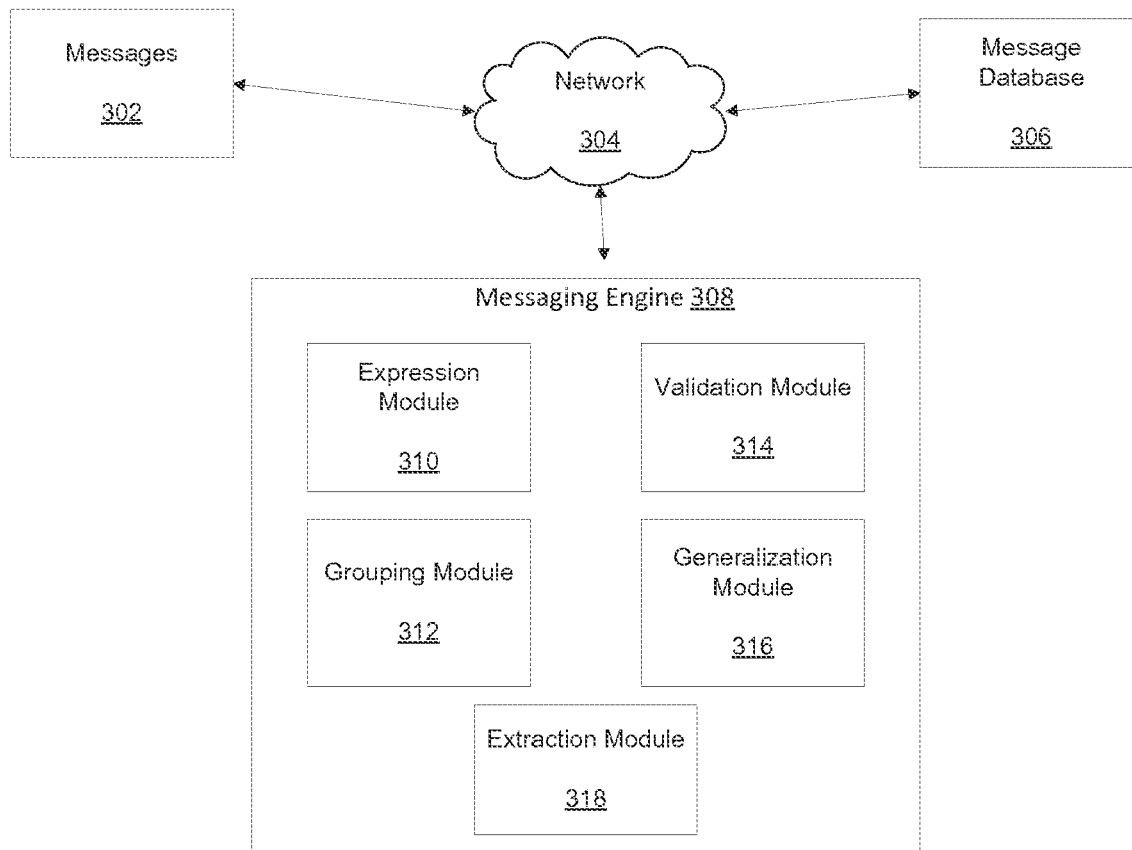

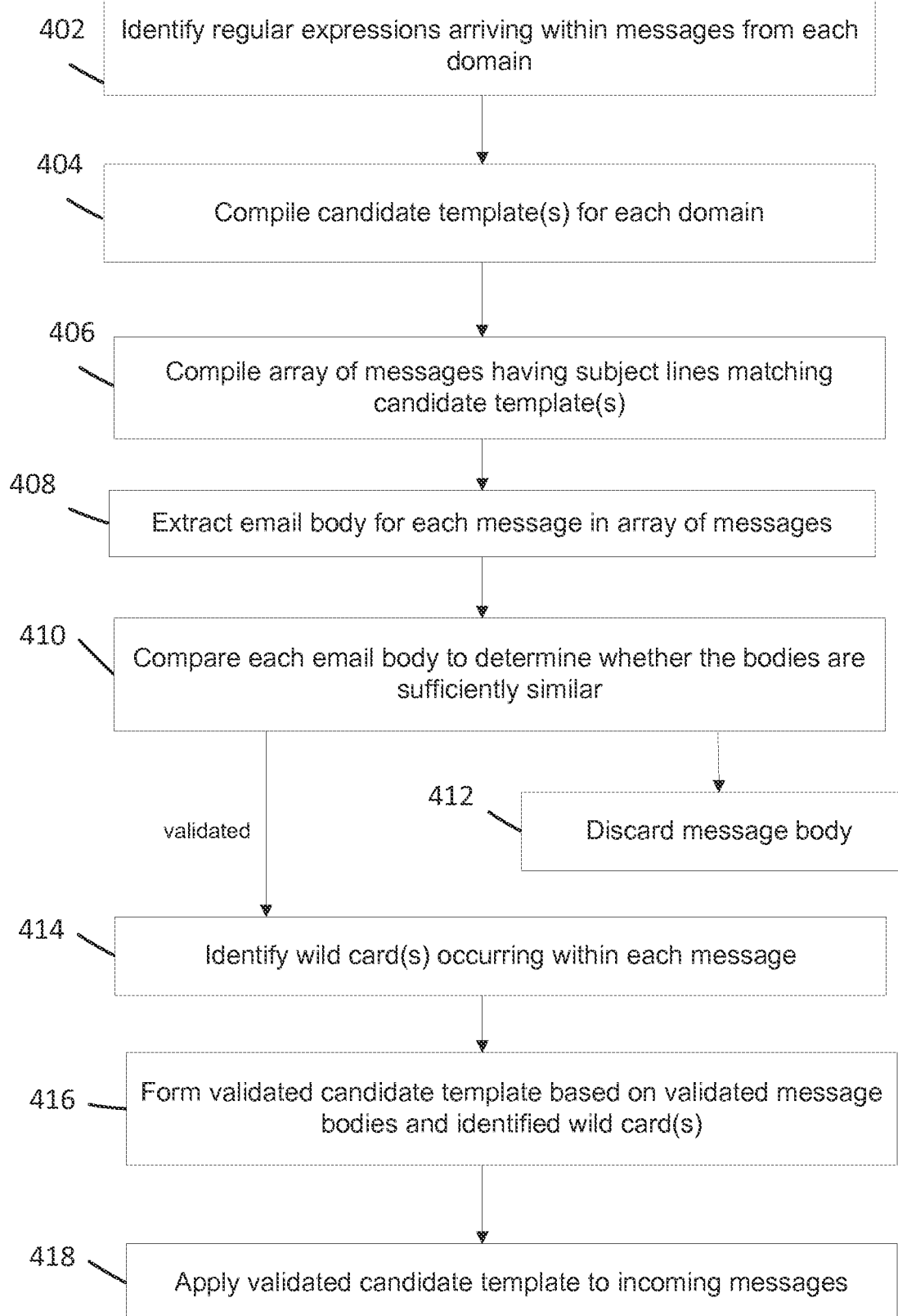

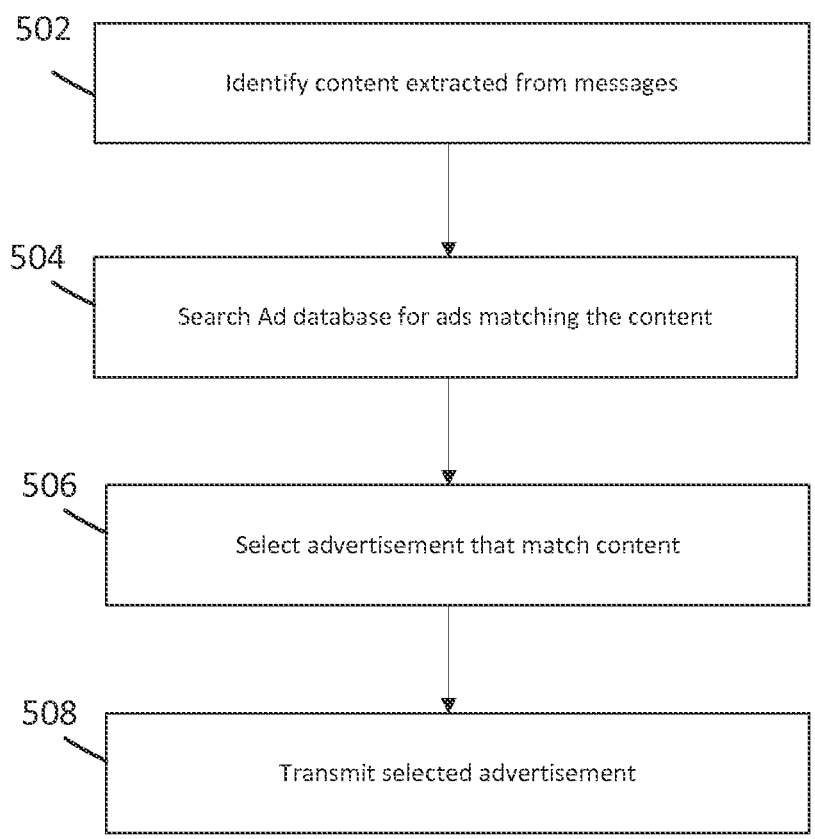

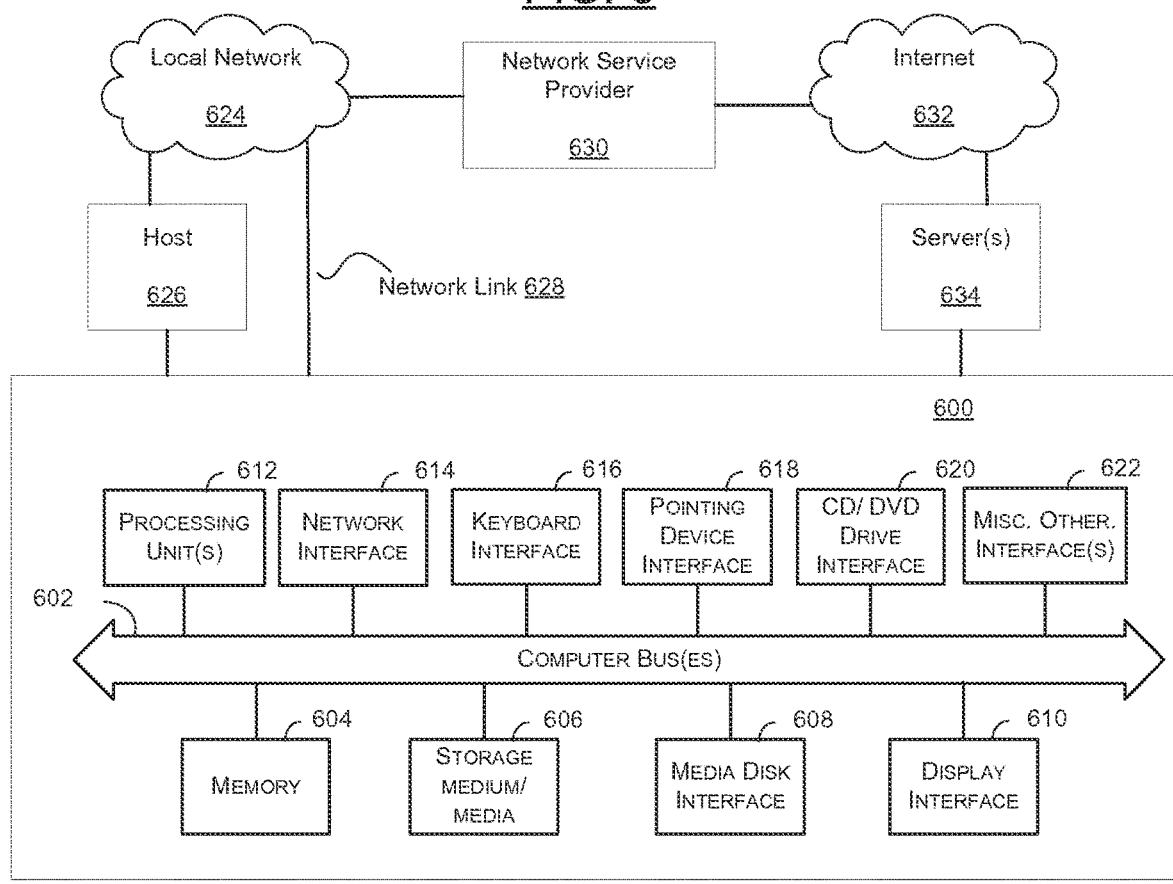

SYSTEM AND METHOD FOR IDENTIFICATION OF SUBJECT LINE TEMPLATES

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to email template recovery, and more particularly towards systems and methods for identifying and validating email templates, and extracting data from emails based on the validated templates in order to improve a user's experience with email.

RELATED ART

Electronic mail ("email") usages have become omnipresent in everyday use for online users as larger numbers of people are able to access the Internet from an array of devices. In addition to providing a way for individuals to communicate more efficiently with each other, electronic mail also provides an effective form of communication for individuals, businesses, organizations, and other entities interested in communicating with large groups of people, such as friends, family, current and customers, and the like. Commercial senders or merchants send many of the messages that users receive in their e-mail accounts. These messages include advertisements, promotions, coupons, purchase confirmations, royalty program messages, institution employee announcements, school notifications and the like. The majority of these messages are machine generated emails originating from a template, or boilerplate. Examples of such templates include textual templates and/or Hyper-Text Markup Language (HTML) templates.

SUMMARY

The present disclosure describes systems and methods for email management that leverages information derived from automatic template generation in order to identify types of messages and message content. The present disclosure describes identifying messages matching specific template types and structures, and automatically extracting important data from email messages matching those templates. The extracted data can be used to improve the user experience in many ways. For example, templates can be analyzed to determine a type of email message, which in turn can be presented to a receiving user within an automatic folder or with a tag designation. Another use of the present disclosure involves producing email snippets or previews from the automatically extracted data for display within a user's inbox, where the most important data from the messages populates the snippets. In yet another advantage of the present disclosure, the extracted data can be used for monetization purposes, where targeted advertisements can be served based upon the data (e.g., content) extracted or identified from such messages.

In accordance with one or more embodiments, a method is disclosed which includes receiving, at a computing device over a network, a plurality of messages sent from a first domain; analyzing, via the computing device, said plurality of messages to identify a regular expression, said regular expression occurring a number of times satisfying an occurrence threshold within said plurality of messages; determining, via the computing device, an array of messages from said plurality of messages, said determination comprising comparing said regular expression against each subject line of said plurality of messages, each message in the array of messages having at least a portion of a subject line matching said regular expression; extracting, via the computing device, each email body of each message in the array of messages, each email body comprising information indicating a format of each message in said array; validating, via the computing device, at least one extracted email body, said validation comprising analyzing each message body's format to determine if said format matches that of another extracted email body's format, said at least one extracted email body having similarities with at least one other extracted email body above a similarity threshold; analyzing, via the computing device, content of the message associated with said at least one extracted email body to determine at least one wild card occurring the message, said at least one wild card comprising content that varies from other messages having an email body above the similarity threshold; compiling, via the computing device, a validated candidate template based on said at least one extracted email body and said at least one wild card; and applying, via the computing device, said validated candidate template to a first message communicated from said first domain to a recipient.

In accordance with one or more embodiments, a non-transitory computer-readable storage medium is provided, the computer-readable storage medium tangibly storing thereon, or having tangibly encoded thereon, computer readable instructions that when executed cause at least one processor to perform a method for identifying and validating email templates, and extracting data from emails based on the validated templates in order to improve a user's experience with email.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 3 is a schematic block diagram illustrating components of a system in accordance with embodiments of the present disclosure;

FIG. 4 is a flowchart illustrating steps performed in accordance with some embodiments of the present disclosure;

FIG. 5 is a flowchart illustrating steps performed in accordance with some embodiments of the present disclosure; and FIG. 6 is a block diagram illustrating architecture of a hardware device in accordance with one or more embodiments of the present disclosure.

DESCRIPTION OF EMBODIMENTS

Figure 1:
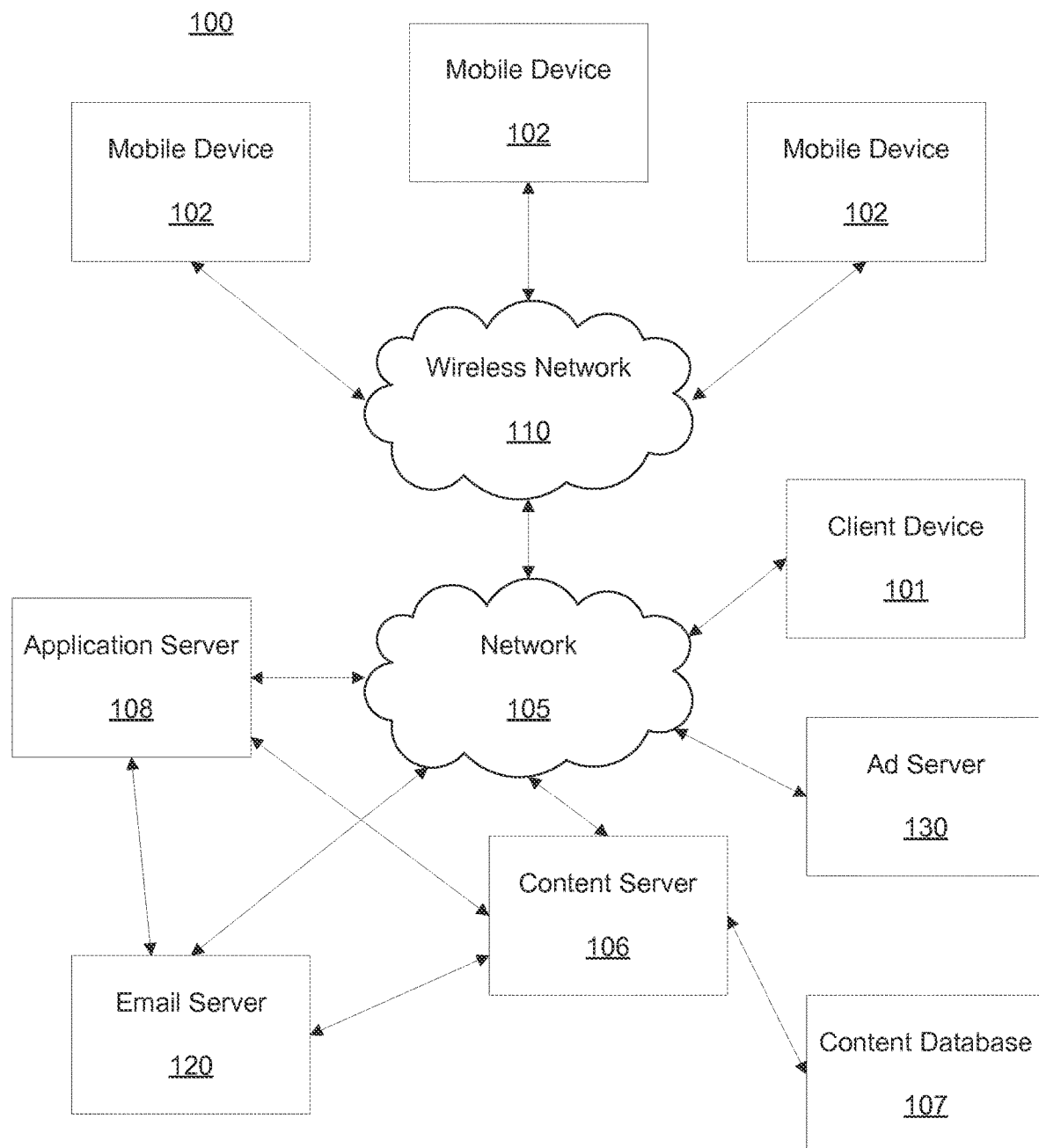
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of a general purpose computer, special purpose computer, ASIC, or other programmable data processing apparatus, such that the instructions, which execute via the processor of the computer or other programmable data processing apparatus, implement the functions/acts specified in the block diagrams or operational block or blocks.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines. Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. Claimed subject matter is intended to cover a wide range of potential variations. For example, a cell phone may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

The principles described herein may be embodied in many different forms. Modern active email users receive a large number of messages that were generated by automatic or machine generated processes. These types of messages include, for example, password change emails, purchase confirmations, social notifications, advertisements, promotions, coupons, bills, royalty program messages, institution announcements, news feeds and the like. In fact, currently more than 90% of email traffic is machine generated. Each of these machine generated messages originates through the use of a boilerplate or template during the generation of the messages. These processes typically enable email senders, such as merchants, business entities, service providers and the like, to utilize a message template for creating content, specifically, email messages. Such templates may include one or more variable fields, which specify particular data types. Generally, when messages are created using templates, each variable field may be replaced with one or more data values related to the message content of a particular data type.

Typically, there are two types of email templates: global templates and site-specific templates. An email template generally has the following properties:

| | |
|---|---|
| Display name | The name of the template displayed in the user interface. |
| Code name | The name of the template used in code. |
| E-mail type | Identifies the type of functionality to which the template is related. This can be used to categorize and filter e-mail templates. |
| From | E-mail address that will be used as the sender (From) address of the e-mail. |
| Cc | E-mail addresses of copy recipients. |
| Bcc | E-mail addresses of blind copy recipients. These will get a copy of the e-mail, but won't see the addresses of other recipients in the mail. |
| Subject | Subject of the e-mail. |
| HTML version | Defines the content that is used for the template when sending e-mails in HTML format. The preferred format can be selected using the Site Manager -> Settings -> System -> E-mails -> E-mail format setting. |
| Plain text version | Plain text version of the e-mail template. |

The presently disclosed systems and methods leverage information derived from automatically generated templates in order to identify types of messages and message content. The systems and methods discussed herein involve identifying messages matching specific template types and structures, and automatically extracting important data from email messages matching those templates. Conventional systems for template recovery and data extraction typically only identify regular expressions that cover many strings from a pre-existing repository of strings. Additionally, these systems produce a majority of candidate templates that are not valid in the sense that the email messages matching them do not originate from the same automatic process. The disclosed systems and methods improve the state of the art by identifying regular expressions for not only identifying types of content, but also to identify specific templates created from given machine generated processes. Additionally, the present disclosure includes an automatic process for verifying the quality of the templates. Thus, the present disclosure provides an efficient, accurate and effective usage orientation for extracting important data from email messages that otherwise would be impossible to extract.

The present disclosure provides systems and methods for identifying messages matching templates that were automatically generated, which enables automatic extraction of the important data/information (by way of non-limiting example, content, data or metadata, whether visible or invisible to the sender or recipient). Non-limiting examples of such type of data includes items being purchased, the name of a new friend in a social network, a shipment tracking number, itinerary for a flight, and the like. These types of information can be extracted in order to improve the user experience and increase monetization. For example, templates can be analyzed to determine a type of email message, which in turn can be presented to a receiving user within an automatic folder or tag designation. Another use of the present disclosure involves producing email snippets or previews from the automatically extracted data for display within a user's inbox, where the most important data from the messages populates the snippets. In yet another advantage of the present disclosure, the extracted data can be used for monetization purposes, where targeted advertisements can be served based upon the data (e.g., content) extracted or identified from such messages.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")-network 105, wireless network 110, mobile devices (client devices) 102-104 and client device 101. FIG. 1 additionally includes a variety of servers, such as content server 106, application (or "App") server 108, email server 120 and advertising ("ad") server 130.

One embodiment of mobile devices 102-103 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, share photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly. Wireless network 110 may further employ a plurality of access technologies including 2nd (2G), 3rd (3G), and/or 4th (4G) generation radio access for cellular systems, WLAN, Wireless Router (WR) mesh, and the like. Access technologies such as 2G, 3G, 4G and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between content servers 106, application server 108, client device 101, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within a social networking site. A social network refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site, such as an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, email services, photo services, web services, third-party services, audio services, video services, email services, instant messaging (IM) services, SMS services, MMS services, FTP services, voice over IP (VOIP) services, or the like. Such services, for example the email services and email platform, can be provided via the email server 120. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s). Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In an embodiment, users are able to access services provided by servers 106, 108, 120 and/or 130. This may include in a non-limiting example, email servers, social networking services servers, SMS servers, IM servers, MMS servers, exchange servers, photo-sharing services servers, and travel services servers, via the network 105 using their various devices 101-104. In some embodiments, applications, such as a photo-sharing or viewing application (e.g., Flickr®, Instagram®, and the like), can be hosted by the application server 108. Thus, the application server 108 can store various types of applications and application related information including application data and user profile information. In another example, email server 120 can host email applications; therefore, the email server 120 can store various types of applications and application related information including email application data and user profile information. It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
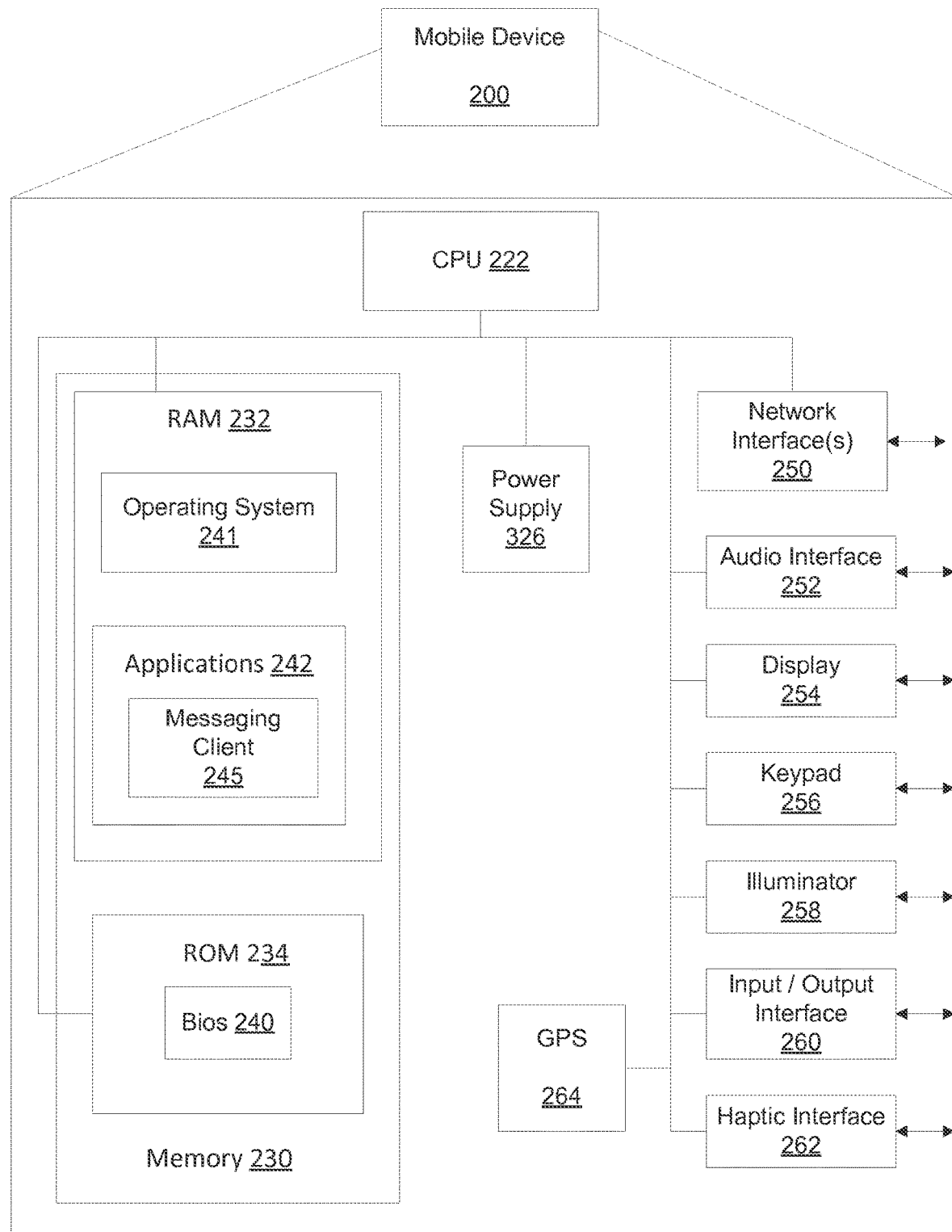
FIG. 2 depicts is a schematic diagram illustrating a client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to Client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies including, but not limited to, global system for Client communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the Client device 200 receives a communication from another user.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. It is understood that under different conditions, GPS transceiver 264 can determine a physical location within millimeters for Client device 200; and in other cases, the determined physical location may be less precise, such as within a meter or significantly greater distances. In one embodiment, however, Client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by Client device 200 to store, among other things, applications 242 and/or other data. For example, data stores may be employed to store information that describes various capabilities of Client device 200. The information may then be provided to another device based on any of a variety of events, including being sent as part of a header during a communication, sent upon request, or the like. At least a portion of the capability information may also be stored on a disk drive or other storage medium (not shown) within Client device 300.

Applications 242 may include computer executable instructions which, when executed by Client device 200, transmit, receive, and/or otherwise process audio, video, images, and enable telecommunication with another user of another client device. Other examples of application programs include calendars, browsers, contact managers, task managers, transcoders, database programs, word processing programs, security applications, spreadsheet programs, games, search programs, and so forth. Applications 242 may further include messaging client 245 that is configured to send, to receive, and/or to otherwise process messages using SMS, MMS, IM, email, VOIP, and/or any of a variety of other messaging communication protocols. Although a single messaging client 245 is illustrated it should be clear that multiple messaging clients may be employed. For example, one messaging client may be configured to manage SMS messages, where another messaging client manages IM messages, and yet another messaging client is configured to manage serving advertisements, emails, or the like.

Having described the components of the general architecture employed within the disclosed systems and methods, the components' general operation with respect to the disclosed systems and methods will now be described.

FIG. 3 is a block diagram illustrating the components of system 300 for performing the systems and methods discussed herein. FIG. 3 includes a plurality of messages 302, a network 304, a messaging engine 308 and a database 306 for storing messages. The message engine 308 could be hosted by a web server, content provider, email service provider, ad server, a user's computing device, or any combination thereof. The plurality of messages 302 can be any type of message. Examples of such messages 302 can include HTML forms, email messages, comments to an article or website, online forum posts/entries, word processing documents, help desk messages, portable document format (PDF) documents and/or other types of documents. The messages 302 can be provided to the message engine 308 or accessed by a computer program or device that can access the messages. In some embodiments, the messages 302 can be stored in a database of stored messages 306, which is associated with an email provider, such as Yahoo! Mail®. The database 306 can be any type of database or memory that can store the messages 302 and associated message template information, as discussed above. For purposes of the present disclosure, email messages as a whole are discussed within some embodiments; however, it should not be construed to limit the applications of the systems and methods discussed herein. Indeed, while reference is made throughout the instant disclosure to email messages, other forms of electronic documents or transmissions (e.g., Short Message Service (SMS) messages, Multimedia Message Service (MMS) messages, and the like) can be received and/or accessed and processed by the message engine 308 according to the systems and methods discussed herein.

As discussed above, with reference to FIG. 1, the network 304 can be any type of network such as, but not limited to, a wireless network, a local area network (LAN), wide area network (WAN), the Internet, or a combination thereof. The network 304 facilitates connectivity between the messages 302, the message engine 308, and the database of stored resources 306.

The message engine 308 includes an expression module 310, a grouping module 312, the validation module 314 (also referred to as a classifier), a generalization module 316 and an extraction module 318. It should be understood that the engine(s) and modules discussed herein are non-exhaustive, as additional or fewer engines and/or modules may be applicable to the embodiments of the systems and methods discussed. The operations, configurations and functionalities of each module, and their role within embodiments of the present disclosure will be discussed with reference to FIG. 4, whereby the components of system 300 are implemented to perform the steps and processes of process 400.

FIG. 4 is a process 400 diagram illustrating steps performed in accordance with embodiments of the present disclosure. As discussed above, the present disclosure generally involves determining automatically (or machine) generated templates used for sending emails, and based on such determination, extracting important data, information and content from email messages. The systems and methods discussed herein in process 400 leverage information derived from the identified templates in order to identify types of messages, message structures and message content. The extracted message information is utilized to improve a user's experience with email and/or the user's email service/platform, and increase monetization, as discussed in more detail below.

In Step 402, email traffic is monitored (and analyzed) to identify regular expressions arriving within messages from a given domain. This step is performed by the expression module 310 of the messaging engine 308. In some embodiments, such monitoring and identification is performed separately for every domain, as each domain typically employs a certain type of template (or boilerplate). In some embodiments, the steps discussed herein are also applicable to every user. Therefore, embodiments exist where regular expressions arriving from each sender are identified. Overall, communicated messages over a network are analyzed to identify the sender's identity, e.g., which domain the message is originating from. In some embodiments, the monitoring of emails occurs from (or within) a single message platform, e.g., Yahoo! Mail®; and in some embodiments, the monitoring of messages occurs across multiple platforms, such as Yahoo! Mail®, Google Mail®, Hotmail®, and other personal and business email platforms, such as Microsoft Outlook®, and the like. This monitoring occurs by analyzing all incoming and outgoing messages from all known (and/or trusted) accounts, and parsing message traffic on a network to identify regular expressions associated with the electronic messages. This monitoring (or identifying) occurs for every user's inbox. Such monitoring and/or analysis can be based any known or to be known learning/monitoring techniques and/or algorithms in order to efficiently and properly compile such regular expressions, and/or any data attributes and details related to the messages on a network. According to some embodiments, monitoring can occur offline and/or online, in order to continuously update and/or build a listing of identified regular expressions, as discussed in more detail below.

As understood by those of skill in the art, a regular expression (often abbreviated as "regex or regexp") is a sequence of characters that forms a pattern. This pattern can be used for pattern matching within strings or string matching, for example, within email messages. Each character in the regular expression is either understood as a metacharacter or a regular character. The regular character is typically understood to carry its literal meaning. The metacharacter is a character that has a special meaning to a computer program (e.g., email program, i.e., Yahoo! Mail®).

Thus, in accordance with some embodiments, a regular expression can be a term, word, phrase or combination of words and characters or numbers that typically appears in an email message. In some embodiments, regular expressions also can dictate a pattern or structure of content, such as email templates. Therefore, turning back to Step 402, process 400 begins by identifying regular expressions that cover a minimum fixed percentage of email traffic arriving from each domain. That is, regular expressions that appear or are associated with a percentage of messages above a threshold from a domain are identified.

In Step 404, a listing of regular expressions is compiled. This step is performed by the grouping module 312 of the messaging engine 308. Specifically, for each regular expression occurring above a threshold for each domain, a listing of such expressions is compiled. These listings are referred to as "candidate templates." As discussed above, such regular expressions involve sequences of characters respective patterns or structures of messages. Therefore, the candidate templates can provide information respective an email message's layout and other structural email information. Thus, the candidate template listing represents regular expressions and templates for each domain, and provides identifying information respective the template producing process implemented by each domain upon sending an email, as discussed in more detail below.

In Step 406, for each candidate template associated with each domain, an array of email messages is identified based on the subject lines of messages. This step is performed by the validation module 314 (either alone or in combination with the grouping module 312) of the messaging engine 308. According to some embodiments, for each candidate template associated with a domain, messages communicated from the domain are analyzed to identify subject lines that match the regular expressions identified in Step 404. That is, the listing of regular expressions are compared against email messages arising from a domain in order to compile an array of messages whose subject lines matches the regular expressions. Thus, an array of messages is compiled for each domain respective each candidate template (i.e., each domain's candidate templates). For example, CNN® has an associated candidate template listing identifying, among other expressions, "daily news" as an expression. Therefore, in Step 406, message traffic from CNN® is analyzed to identify an array of messages having the expression "daily news" in the subject line. In some embodiments, the array of messages includes 50 messages; however, this can be altered, modified and set by a system administrator, content provider, the system as a whole for accuracy and efficiency, and/or a combination thereof.

According to some embodiments, the comparison of subject lines accounts for the sending domain's size. For smaller domains, or domains that have sent few or a low amount of emails (either over time, daily or periodically), process 400 reviews each email and counts the number of times, and how often (or frequent) an expression appears in a subject line. If this satisfies a threshold (which can be set by a user, system, content provider, system administrator, or combination thereof), then the array of messages is compiled for that domain, as discussed above. For larger domains, or domains that send a large amount of emails, in order to avoid overhead, a sample subset of message traffic is utilized. According to some embodiments, should these expressions occur above a threshold which, by way of non-limiting example can be set by a user, system, content provider, system administrator, or combination thereof, then the array of messages is compiled for that domain, as discussed above. According to some embodiments, the threshold for the larger domains respective the sample subset of emails involves an expression (or term) appearing at or above 5% of the time or more or less than 5%.

In Step 408, the message bodies of the messages within the array of messages are extracted. This step is performed by the validation module 314 of the messaging engine 308. That is, for each message in the array of messages, the structural design, pattern or format (i.e., email template) of each message is extracted. From the above example, the emails matching "daily news" which form the array for the domain CNN®, are then analyzed and each email's message format (or message body) is extracted.

In Step 410, each extracted email body is compared against each other to validate (or verify) that each message originates from the same automatic process. That is, each extracted email body's format is compared against another extracted message's format to determine the similarities between each messages format. Should the formats be sufficiently similar, then the format of the email bodies is validated. According to some embodiments, sufficiency of similarity between formats involves each format having a certain number of structural qualities at or above a threshold. This step is performed by a validation module 314. According to some embodiments, the validation module 314 can employ known or to be known machine learning techniques to identify similarities between emails and their evolving counterparts due to changes and advances in email, communication and security protocols for such messages. Thus, the validation module 314 is initially programmed or trained with a set of valid candidate regular expressions, and as the process 400 compiles the candidate templates, as discussed above, this set of expressions evolves. The validation module 314 then analyzes each message's format (or message body) and based on determined information between each message's body, determines how similar each message is in format. By way of non-limiting example, solely for illustration purposes and not to be construed as limiting in nature regarding the values or characteristics the validation module 314 utilizes to perform the above comparison, the validation module 314 can compare various features for HTML messages including, but not limited to, a determined edit distance between HTML tags, HTML comments, or the content and/or layout of the message itself.

For example, JetBlue® sends emails regarding people's travel itineraries (e.g., flights), where a regular expression for such emails, referred to as a candidate template, includes "Check In for your flight". An array of messages is compiled from message traffic originating from JetBlue® (e.g., @jetblue.com) by identifying messages that have "Check In for your flight" in the subject line. Then, the email bodies of such messages are extracted and compared. The comparison corresponds to the message format or email structure of each message's body.

If the message bodies are sufficiently similar, as discussed above, then the messages are validated. That is, the messages have been confirmed to have originated not only from the same domain, but also via the same automatic process. In other words, the domain utilized the same message template for structuring and drafting the email messages. If the message bodies are not found to be sufficiently similar, then the message body (e.g., template for that message or format) is discarded. Step 412.

For validated messages, a generalization step occurs next to identify wild cards (or words that change from message to message despite messages having been originated via the same process). In Step 414, the content of each message is then analyzed to determine wild cards occurring in each message. This step is performed by a generalization module 316. This analysis comprises comparing each message's content to identify content that differs within each validated message. Examples of wild cards include, but are not limited to, airport codes, city names, country names, dates, times, sender's names, salutations, recipient's names, greetings, and the like. According to some embodiments, the text of a message is analyzed, and in some embodiments, all of the content is analyzed, accounting for text, audio, video, images, attachments, and the like.

For example, from the above JetBlue® example, for two validated messages associated with the candidate template arising from the subject line identification of "Check In to your flight", there will be differences between the messages despite originating from the same domain and utilizing the same automatic generation process. For example, message 1 states "Check In to you flight LAX to EWR", whereas message 2 states "Check In to your flight AUS to BNA." Therefore, the regular expression, as discussed above is "Check In to your flight", and the wild card text is the text that follows the regular expression. Specifically, the wild cards can be identified as "LAX", "EWR", "AUS" and "BNA." Indeed, while the message template is the same for each message, the specifics of each message may change, as in this example where each message's flight itinerary relayed different flight information, but still maintained the same format and structure.

In another example, two messages state "your order of X" and "your order of Y". Therefore, from the above discussion, it is known that the expression "your order of" is the regular expression and is formatted within the structural design of the email message. The text "X" and "Y" will then be identified as the wild cards as they differ from each validated message, in that a message having been identified as being sent via the same automatic process still can carry differences in content specific to the context of each message.

In Step 416, for each domain's candidate template(s), a template listing is formed based on the analysis of validated email bodies and the generalization step. This step is performed by a generalization module 316. That is, for each domain, and for each domain's original candidate listing, a validated candidate listing is compiled, which also includes or has associated therewith information regarding types of wild cards utilized in each message, and in some embodiments, locations of such wild cards within such message types. Therefore, for newly incoming message traffic, the validated candidate listing can be applied to such messages to perform message extraction, as operably performed by the extraction module 318. Step 418. That is, for an incoming message from a specific domain, the domain specific validated candidate template is applied to that message, and based on this application, data extraction occurs. Such data extraction is applied respective the email format identified via the validation process of the email bodies extracted from the array of message. Additionally, the data extraction also accounts for the wild cards determined in the generalization step, where information regarding such wild cards and/or their locations within message bodies is applied or utilized in extracting message content from incoming messages.

For example, from above example regarding JetBlue®, process 400 has compiled a validated candidate template for emails from JetBlue® regarding "Checking In" to a flight. Thus, the format and structure of such emails has been identified (and verified). Additionally, via the generalization step, wild cards, their usage and location of such usage within such email messages (or within such layouts) have also been identified. As discussed above, this information is associated with the validated candidate template (in storage on the content provider or email server, or in an associated database accessible to either or both service providing servers). Therefore, upon receiving another message for "Checking In" from JetBlue®, the validated candidate template for "Checking In" respective JetBlue® is applied. For example, user A receives a message stating "Check In to your flight SFO to AUS". The term "AUS" has previously been identified (from the above example), therefore it has been identified as a wild card. Although "SFO" has not been previously identified as a wild card, the location of wild cards coincides with "SFO"'s location, therefore SFO can be identified as a wild card. As such, based the extraction of message respective the message body and wild card(s), extraction of the message can compile information of high relevance to the user, which from this example, can include a travel itinerary.

According to some embodiments, based on the extracted information, a type of email message can be determined. This can enable the systems and methods discussed herein to direct incoming email traffic to specific email folders. Additionally, types of messages can also be tagged to identify to the user the type of message. From the above example, the message can be tagged with a "travel" designation in the user's inbox, or tagged "important" as it indicates a user's travel itinerary. In some embodiments, the systems and methods discussed herein can generate snippets (or previews) of content based on the extracted data. From the above example, the extracted data includes a user's travel itinerary: e.g., SFO to AUS, on Dec. 31, 2013 at 8:55 pm. This information can be provided as an email snippet or preview of content from the message that relates to the most relevant/important content in the message. The snippet or preview can be displayed to the user within the user's inbox, or as a preview of the message, or other known or to be known methods of providing previews for messages. In some embodiments, the extracted data can be used for monetization purposes, where targeted advertisements can be served based upon the data (e.g., content) extracted or identified from such messages, as discussed in more detail below.

FIG. 5 is a work flow 500 of serving relevant advertisements based on the extracted data from received messages. Specifically, FIG. 5 illustrates how advertisements are served to a recipients of messages based on the specific content extracted from the messages directed to a recipient. In Step 502, content extracted from a message is identified. That is, as discussed above, content extracted from messages is compiled, as in Step 318, and this content, forms a basis for a context for serving advertisements having a similar context. In Step 504, the content (or content data) is communicated (or shared) from the email platform to an advertisement server 130. Upon receipt of the content data, the advertisement server 130 performs a search for a relevant advertisement within an associated advertisement database. The search for an advertisement is based at least on the extracted content.

In Step 504, the advertisement server 130 searches the advertisement database for advertisements that match the identified (and extracted) content. In Step 506, an advertisement is selected (or retrieved) based on the results of Step 504. In some embodiments, the advertisement can be selected based upon the result of Step 504, and modified to conform to attributes of the page or inbox upon which the advertisement will be displayed, and/or to the device for which it will be displayed. In some embodiments, as in Step 508, the selected advertisement is shared or communicated via the email platform. In some alternative embodiments, the selected advertisement is sent directly to each user's computing device.

For example, from the above JetBlue® example, the extracted data relates towards a user's travel itinerary. Therefore the ads can be selected to provide advertisements or promotions for deals in the identified destination city, or ads for future airline discounts/deals for JetBlue®, for example.

As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media 606, network interface 614, memory 604, e.g., random access memory (RAM), run-time transient memory, read only memory (ROM), media disk drive interface 620 as an interface for a drive that can read and/or write to media including removable media such as floppy, CD-ROM, DVD, media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces and a universal serial bus (USB) interface.

Memory 604 interfaces with computer bus 602 so as to provide information stored in memory 604 to CPU 612 during execution of software programs such as an operating system, application programs, device drivers, and software modules that comprise program code, and/or computer executable process steps, incorporating functionality described herein, e.g., one or more of process flows described herein. CPU 612 first loads computer executable process steps from storage, e.g., memory 604, computer readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 628 typically provides information communication using transmission media through one or more networks to other devices that use or process the information. For example, network link 628 may provide a connection through local network 624 to a host computer 626 or to equipment operated by a Network or Internet Service Provider (ISP) 630. ISP equipment in turn provides data communication services through the public, worldwide packet-switching communication network of networks now commonly referred to as the Internet 632.

A computer called a server host 634 connected to the Internet 632 hosts a process that provides a service in response to information received over the Internet 632. For example, server host 634 hosts a process that provides information representing video data for presentation at display 610. It is contemplated that the components of system 600 can be deployed in various configurations within other computer systems, e.g., host and server.

At least some embodiments of the present disclosure are related to the use of computer system 600 for implementing some or all of the techniques described herein. According to one embodiment, those techniques are performed by computer system 600 in response to processing unit 612 executing one or more sequences of one or more processor instructions contained in memory 604. Such instructions, also called computer instructions, software and program code, may be read into memory 604 from another computer-readable medium 606 such as storage device or network link. Execution of the sequences of instructions contained in memory 604 causes processing unit 612 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 600. Computer system 600 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 602 as it is received, or may be stored in memory 604 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

monitoring, via a computing device over a network, email traffic associated with each user's inbox for a first domain, said monitoring comprising parsing said email traffic, and based on said parsing, identifying, via the computing device over the network, a plurality of messages sent from first domain during said monitoring, said first domain having a template of messages specific to said first domain such that said plurality of messages comply with said template;

analyzing, via the computing device, said plurality of messages based on the template of the first domain, said analysis comprising applying said template to said plurality of messages and identifying, based on said application, a regular expression for each message, said identification of the regular expression comprising determining a number of times said regular expression occurs within said plurality of messages, and comparing said number against an occurrence threshold, and when said number satisfies the occurrence threshold, identifying said regular expression, said occurrence threshold set in accordance with a volume of messages being communicated over said first domain;

determining, via the computing device, an array of messages from said plurality of messages, said determination comprising comparing said regular expression against each subject line of said plurality of messages, each message in the array of messages having at least a portion of a subject line matching said regular expression;

extracting, via the computing device, a structural design of each message in said array of messages, said structural design corresponding to an email body of each message in the array of messages and indicating a format of each message in said array, the structural design of each message indicating a pattern of characters with a message and a location within a message's format;

validating, via the computing device executing machine learning software trained on learned message features for said first domain, at least one extracted email body, said validation comprising analyzing each message's structural design, in accordance with the learned message features applied by the machine learning software, to determine if said format matches that of another extracted email body's format, said at least one extracted email body having similarities with at least one other extracted email body above a similarity threshold;

analyzing, via the computing device, content of the message associated with said at least one extracted email body to determine at least one wild card occurring within the message, said at least one wild card comprising content that varies from other messages having an email body above the similarity threshold;

creating, via the computing device, a validated candidate template based on said at least one extracted email body and said at least one wild card;

applying, via the computing device, said validated candidate template to a first message communicated from said first domain to a recipient, said application causing an intended display and communication of the first message to be modified, said modification causing the initial display and communication to be changed to comply with the applied validated candidate template; and causing display, via the computing device, of said first message in an inbox associated with the recipient based on said modified display and communication.

2. The method of claim 1, wherein said application of said validated candidate template comprises:

extracting content from said first message based on said validated content, said extraction comprising:
identifying first content within said first message based on said at least one extracted email body; and
identifying second content from said first message based on said at least one wild card.

3. The method of claim 1, wherein said at least one wild card further comprises information indicating a location within an email message where other wild cards are located, said location based on a location of said at least one wild card.

4. The method of claim 1, wherein said first message comprises a plurality of messages sent from said first domain.

5. The method of claim 1, wherein said first domain comprises a plurality of domains, wherein said plurality of domains comprising any domain supporting email transmittal over the network.

6. The method of claim 1, wherein said similarity threshold applied during said validation is based on continuously monitoring message activity on at least one message platform to determine updated formats of messages.

7. The method of claim 1, wherein said format of each message comprises information regarding a layout of each message.

8. The method of claim 1, wherein said regular expression comprises a sequence of characters that forms the pattern within an email message, wherein said regular expression is a plurality of regular expressions.

9. The method of claim 1, wherein said occurrence threshold covers a minimum fixed percentage of email traffic arriving from said first domain.

10. The method of claim 1, wherein said messages are email messages.

11. A non-transitory computer-readable storage medium tangibly encoded with computer-executable instructions, that when executed by a processor associated with a computing device, performs a method comprising:

monitoring, via the computing device over a network, email traffic associated with each user's inbox for a first domain, said monitoring comprising parsing said email traffic, and based on said parsing, identifying, via the computing device over the network, a plurality of messages sent from first domain during said monitoring, said first domain having a template of messages specific to said first domain such that said plurality of messages comply with said template;

analyzing, via the computing device, said plurality of messages based on the template of the first domain, said analysis comprising applying said template to said plurality of messages and identifying, based on said application, a regular expression for each message, said identification of the regular expression comprising determining a number of times said regular expression occurs within said plurality of messages, and comparing said number against an occurrence threshold, and when said number satisfies the occurrence threshold, identifying said regular expression, said occurrence threshold set in accordance with a volume of messages being communicated over said first domain;

determining, via the computing device, an array of messages from said plurality of messages, said determination comprising comparing said regular expression against each subject line of said plurality of messages, each message in the array of messages having at least a portion of a subject line matching said regular expression;

extracting, via the computing device, a structural design of each message in said array of messages, said structural design corresponding to an email body of each message in the array of messages and indicating a format of each message in said array, the structural design of each message indicating a pattern of characters with a message and a location within a message's format;

validating, via the computing device executing machine learning software trained on learned message features for said first domain, at least one extracted email body, said validation comprising analyzing each message's structural design, in accordance with the learned message features applied by the machine learning software, to determine if said format matches that of another extracted email body's format, said at least one extracted email body having similarities with at least one other extracted email body above a similarity threshold;

analyzing, via the computing device, content of the message associated with said at least one extracted email body to determine at least one wild card occurring the message, said at least one wild card comprising content that varies from other messages having an email body above the similarity threshold;

creating, via the computing device, a validated candidate template based on said at least one extracted email body and said at least one wild card;

applying, via the computing device, said validated candidate template to a first message communicated from said first domain to a recipient, said application causing an intended display and communication of the first message to be modified, said modification causing the initial display and communication to be changed to comply with the applied validated candidate template; and causing display, via the computing device, of said first message in an inbox associated with the recipient based on said modified display and communication.

12. The non-transitory computer-readable storage medium of claim 11, wherein said application of said validated candidate template comprises:
extracting content from said first message based on said validated content, said extraction comprising:
identifying first content within said first message based on said at least one extracted email body; and
identifying second content from said first message based on said at least one wild card.

13. The non-transitory computer-readable storage medium of claim 11, wherein said at least one wild card further comprises information indicating a location within an email message where other wild cards are located, said location based on a location of said at least one wild card.

14. The non-transitory computer-readable storage medium of claim 11, wherein said similarity threshold applied during said validation is based on continuously monitoring message activity on at least one message platform to determine updated formats of messages, and wherein said occurrence threshold covers a minimum fixed percentage of email traffic arriving from said first domain.

15. A system comprising:
at least one computing device comprising:
memory storing computer-executable instructions; and
one or more processors for executing said computer-executable instructions, comprising:
monitoring, over a network, email traffic associated with each user's inbox for a first domain, said monitoring comprising parsing said email traffic, and based on said parsing, identifying, via the computing device over the network, a plurality of messages sent from first domain during said monitoring, said first domain having a template of messages specific to said first domain such that said plurality of messages comply with said template;

analyzing said plurality of messages based on the template of the first domain, said analysis comprising applying said template to said plurality of messages and identifying, based on said application, a regular expression for each message, said identification of the regular expression comprising determining a number of times said regular expression occurs within said plurality of messages, and comparing said number against an occurrence threshold, and when said number satisfies the occurrence threshold, identifying said regular expression, said occurrence threshold set in accordance with a volume of messages being communicated over said first domain;

determining an array of messages from said plurality of messages, said determination comprising comparing said regular expression against each subject line of said plurality of messages, each message in the array of messages having at least a portion of a subject line matching said regular expression;

extracting a structural design of each message in said array of messages, said structural design corresponding to an email body of each message in the array of messages and indicating a format of each message in said array, the structural design of each message indicating a pattern of characters with a message and a location within a message's format;

validating, by executing machine learning software trained on learned message features for said first domain, at least one extracted email body, said validation comprising analyzing each message's structural design, in accordance with the learned message features applied by the machine learning software, to determine if said format matches that of another extracted email body's format, said at least one extracted email body having similarities with at least one other extracted email body above a similarity threshold;

analyzing content of the message associated with said at least one extracted email body to determine at least one wild card occurring the message, said at least one wild card comprising content that varies from other messages having an email body above the similarity threshold;

creating a validated candidate template based on said at least one extracted email body and said at least one wild card;

applying said validated candidate template to a first message communicated from said first domain to a recipient, said application causing an intended display and communication of the first message to be modified, said modification causing the initial display and communication to be changed to comply with the applied validated candidate template; and causing display of said first message in an inbox associated with the recipient based on said modified display and communication.

16. The system of claim 15, wherein said application of said validated candidate template comprises:

extracting content from said first message based on said validated content, said extraction comprising:

identifying first content within said first message based on said at least one extracted email body; and identifying second content from said first message based on said at least one wild card.

* * * * *